United States Patent
Kern et al.

(10) Patent No.: US 9,043,449 B2
(45) Date of Patent: May 26, 2015

(54) NETWORK CONNECTION SEGMENT MONITORING

(75) Inventors: András Kern, Budapest (HU); Attila Takács, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 505 days.

(21) Appl. No.: 13/502,009

(22) PCT Filed: Jun. 9, 2010

(86) PCT No.: PCT/IB2010/052573
§ 371 (c)(1),
(2), (4) Date: Jun. 14, 2012

(87) PCT Pub. No.: WO2011/045679
PCT Pub. Date: Apr. 21, 2011

(65) Prior Publication Data
US 2012/0271928 A1    Oct. 25, 2012

Related U.S. Application Data

(60) Provisional application No. 61/251,909, filed on Oct. 15, 2009.

(51) Int. Cl.
*G06F 15/177* (2006.01)
*H04L 12/26* (2006.01)
*H04L 12/24* (2006.01)

(52) U.S. Cl.
CPC ............... *H04L 43/12* (2013.01); *H04L 43/00* (2013.01); *H04L 41/084* (2013.01); *H04L 41/5009* (2013.01); *H04L 41/5077* (2013.01)

(58) Field of Classification Search
CPC . H04L 41/04; H04L 41/0681; H04L 12/2639; H04L 12/5689; H04L 41/084; H04L 41/0811; H04L 41/0213; H04L 12/4616; H04L 12/4633; H04L 12/4641
USPC .......... 709/220, 249; 370/216, 225, 228, 400, 370/240.1, 236.2, 218, 248
See application file for complete search history.

(56) References Cited

U.S. PATENT DOCUMENTS 8,254,272 B1 *  8/2012  Vasseur .................. 370/248
2006/0126503 A1 *  6/2006  Huck et al. ............. 370/225

(Continued)

OTHER PUBLICATIONS

Takacs et al, IETF draft "GMPLS RSVP-TE Extensions to Control Ethernet OAM" draft-takacs-ccamp-rsvp-te-eth-oam-ext-01, Feb. 25, 2008.*

(Continued)

*Primary Examiner* — Wing F Chan
*Assistant Examiner* — Raji Krishnan
(74) *Attorney, Agent, or Firm* — Coats & Bennett, P.L.L.C.

(57) ABSTRACT

An example method transmits a path message to an egress node, via intermediate nodes, that configures OAM monitoring of an entire connection between an ingress node and the egress node and also configures OAM monitoring of at least one segment of the connection shorter than the entire connection by at least one intermediate node. The path message comprises a LSP attributes object and an ERO. The LSP object comprises technology-specific attributes defining descriptors for configuring the egress node in accordance with a communication protocol utilized for the connection; and technology-independent OAM parameters that, irrespective of the communication protocol, define an OAM type to be used by the egress node, and define desired monitoring actions for the egress node to perform. The ERO comprises a respective HOP Attributes sub-object for configuring each of the at least one intermediate nodes. Each HOP Attributes sub-object also comprises technology-specific attributes and technology-independent OAM parameters.

9 Claims, 12 Drawing Sheets

(56) References Cited

U.S. PATENT DOCUMENTS

| | | | |
|---|---|---|---|
| 2006/0268680 A1* | 11/2006 | Roberts et al. | 370/216 |
| 2007/0036080 A1* | 2/2007 | Addeo et al. | 370/241.1 |
| 2008/0084890 A1* | 4/2008 | Kompella | 370/400 |
| 2008/0101241 A1* | 5/2008 | Mohan et al. | 370/236.2 |
| 2008/0172497 A1* | 7/2008 | Mohan et al. | 709/249 |
| 2008/0247322 A1* | 10/2008 | Klink | 370/241.1 |
| 2009/0285089 A1* | 11/2009 | Srinivasan | 370/218 |
| 2013/0114416 A1* | 5/2013 | Rao et al. | 370/241 |

OTHER PUBLICATIONS

Farrel et al, IETF RFC 4420 : "Attributes for MPLS LSPs Using RSVP-TE", Feb. 2006.*

Awduche et al, IETF RFC 3209 : "RSVP-TE: Extensions to RSVP for LSP Tunnels", Dec. 2001.*

Takács, A., et al., "OAM Configuration Framework and Requirements for GMPLS RSVP-TE" Internet-Draft, Mar. 9, 2009. Internet Engineering Task Force (IETF), Internet Society, Geneva, Switzerland.

Chun, K., et al., "Tandem connection monitoring in the MPLS network" Proceedings of Asia-Pacific Conference on Communications 2007. pp. 345-348. Oct. 1, 2007. IEEE, Piscataway, NJ.

Busi, ed., et al., "MPLS-TP OAM Framework." Internet-Draft, Jul. 13, 2009. Internet Engineering Task Force (IETF), Internet Society, Geneva, Switzerland.

O'Connor, D. "Packet Transport OAM-Service Provider Alternatives." OFCNFOEC 2007, Mar. 25-29, 2007, Anaheim, CA. IEEE, Piscataway, NJ.

Nadeau, T., et al., "OAM Requirements for Generalized Multi-Protocol Label Switching (GMPLS) Networks." Internet-Draft, Oct. 22, 2007. Internet Engineering Task Force (IETF), Internet Society, Geneva, Switzerland.

Takacs. "OAM Configuration Framework and Requirements for GMPLS RSVP-TE draft-ietf-ccamp-oam-configuration-fwk-01." Internet Draft, Mar. 9, 2009, pp. 1-22, Internet Engineering Task Force (IETF), Retrieved from the Internet: URL:http://tools.ietf.org/html/draft-ietf-ccamp-oam-configuration-fwk-01.

Takacs. "GMPLS RSVP-TE Extensions for Ethernet OAM Configuration draft-ietf-ccamp-rsvp-te-eth-oam-ext-01." Internet Draft, Mar. 9, 2009, pp. 1-21, Internet Engineering Task Force (IETF), Retrieved from the Internet:URL:http://tools.ietf.org/html/draft-ietf-ccamp-rsvp-te-eth-oam-ext-01.

Kern. "GMPLS RSVP-TE Extensions for OTN and SONET/SDH OAM Configuration draft-kern-ccamp-rsvp-te-sdh-otn-oam-ext-00." Internet Draft, Jul. 6, 2009, pp. 1-24, Internet Engineering Task Force (IETF), Retrieved from the Internet:URL:http://tools.ietf.org/id/draft-kern-ccamp-rsvp-te-sdh-otn-oam-ext-00.txt.

Bellagamba. "RSVP-TE Extensions for MPLS-TP OAM Configuration draft-bellagamba-ccamp-rsvp-te-mpls-tp-oam-ext-00." Internet Draft, Jul. 2, 2009, pp. 1-10, Internet Engineering Task Force (IETF), Retrieved from the Internet:URL:http://tools.ietf.org/id/draft-bellagamba-ccamp-rsvp-templs-tp-oam-ext-00.txt.

\* cited by examiner

NETWORK CONNECTION SEGMENT MONITORING

RELATED APPLICATIONS

This application claims the benefit of U.S. Provisional Application No. 61/251,909 filed Oct. 15, 2009.

TECHNICAL FIELD

The present invention relates generally to communication networks, and in particular, to a method of configuring tandem connection and non-intrusive monitoring entities for monitoring of connection segments.

BACKGROUND

Most transport network technologies such as Synchronous Digital Hierarchy (SDH), Optical Transport Network (OTN), Multi-Protocol Label Switching Transport Profile (MPLS-TP), and Provider Backbone Bridge-Traffic Engineering (PBB-TE) provide Operation and Maintenance (OAM) functions to monitor the health, or quality, of data plane connections. OAM functions can invoke data plane, control plane, and management plane actions such as protection switching, control plane controlled rerouting, management plane notifying alarms, and the like. Some technologies enable segment monitoring in which particular segments of a connection are monitored. However, the Generalized Multi-Protocol Label Switching (GMPLS) protocol discussed below does not support the configuration of segment-monitoring elements.

The GMPLS protocol is being developed as a common protocol set for various transport networks. The GMPLS signaling protocol is the Resource Reservation Protocol-Traffic Engineering (RSVP-TE), which provisions data plane connections. General attributes related to the end-to-end connections can be encoded in the signaling as well. For this purpose RFC 5420 specifies the Label Switching Protocol (LSP) Attributes object.

A typical use of the LSP Attributes object is to carry the OAM configuration parameters for the end-to-end connection. This solution enables the configuration of monitoring entities referred to as Maintenance Endpoints (MEPs) and Maintenance Intermediate Points (MIPs) and the endpoints of the connection. The GMPLS OAM configuration framework differentiates between technology-independent and technology-specific parts. The technology-independent part defines the OAM type and the desired OAM functionalities (for example, Connectivity Monitoring, delay measurement, and the like). The technology-specific part carries all the descriptors that are essential for configuring the OAM monitoring points.

SUMMARY

A problem with the existing OAM configuration framework is that it supports the configuration of end-to-end monitoring of a connection, but does not support the configuration of internal non-intrusive and tandem connection monitoring elements for segment monitoring. The LSP Attributes object enables parameters related to the end-to-end connections to be encoded, and the content of this object is valid along the entire path. However, the object does not allow general attributes to be specified for a specific segment or a specific element along the path.

An embodiment of the present invention solves this problem by providing a new signaling construct that enables the ingress node to assign general attributes to a particular node placed on the route of the connection. A method of configuring non-intrusive and tandem connection monitoring entities is provided. In one embodiment, a Segment OAM Configuration Type-Length-Value (TLV) carries the control flags and the technology-independent OAM parameters as well as the technology-specific attributes. Combining the segment OAM signaling construct with segment protection signaling makes it possible to provision monitoring entities for a protected segment and to monitor both the entire connection and particular segments.

Thus, in one embodiment, the present invention is directed to a method performed by an ingress node of a communication connection for configuring nodes along the connection to monitor quality of both the entire connection from the ingress node to an egress node and at least one segment of the connection shorter than the entire connection. The method includes configuring at least one OAM monitoring entity located at a point of the connection between the ingress node and the egress node, wherein the ingress node sends to the OAM monitoring entity, technology-independent OAM parameters as well as technology-specific attributes. The technology-independent OAM parameters define an OAM type and desired monitoring actions by the OAM monitoring entity, and the technology-specific attributes define descriptors for configuring the OAM monitoring entity in accordance with a communication protocol utilized for the connection. The method also includes configuring the egress node, wherein the ingress node sends to the egress node, technology-independent OAM parameters defining the OAM type and desired monitoring actions by the egress node, as well as the technology-specific attributes defining descriptors for configuring the egress node in accordance with the communication protocol utilized for the connection.

In another embodiment, the present invention is directed to an ingress node of a communication connection for configuring nodes along the connection to monitor quality of both the entire connection from the ingress node to an egress node and at least one segment of the connection shorter than the entire connection. The ingress node includes means for configuring at least one OAM monitoring entity located at a point of the connection between the ingress node and the egress node, wherein the ingress node sends to the OAM monitoring entity, technology-independent OAM parameters as well as technology-specific attributes. The technology-independent OAM parameters define an OAM type and desired monitoring actions by the OAM monitoring entity, and the technology-specific attributes define descriptors for configuring the OAM monitoring entity in accordance with a communication protocol utilized for the connection. The ingress node also includes means for configuring the egress node, wherein the ingress node sends to the egress node, technology-independent OAM parameters defining the OAM type and desired monitoring actions by the egress node, as well as the technology-specific attributes defining descriptors for configuring the egress node in accordance with the communication protocol utilized for the connection.

In another embodiment, the present invention is directed to a method of configuring an intermediate OAM monitoring entity to monitor the quality of a segment of a communication connection between an ingress node and an egress node, wherein the segment is shorter than the entire connection between the ingress node and the egress node. The method includes constructing by the ingress node, an object that includes technology-independent OAM parameters and technology-specific attributes, wherein the technology-independent OAM parameters define an OAM type and desired monitoring actions by the OAM monitoring entity, and the technology-specific attributes define descriptors for configuring the OAM monitoring entity in accordance with a communication protocol utilized for the connection. The method also includes utilizing Generalized Multi-Protocol Label Switching, GMPLS, signaling to send the object from the ingress node to the OAM monitoring entity. In one embodiment, the object is a Hop Attributes sub-object that includes the technology-independent OAM parameters and technology-specific attributes. In another embodiment, the object is a Label Switching Protocol, LSP, Attributes object including a Segment OAM Configuration Type-Length-Value, TLV, field that includes the technology-independent OAM parameters and technology-specific attributes.

DETAILED DESCRIPTION

Figure 1:
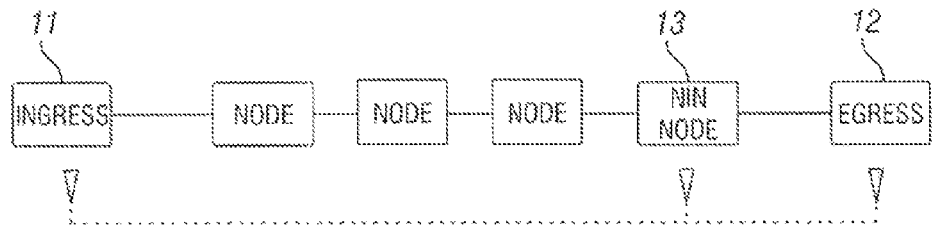
FIG. 1 (Prior Art) is an illustrative drawing of a communication connection 10 in which Non-Intrusive Monitoring (NIM) of a segment of the connection has been implemented using an existing methodology.
Figure 2:
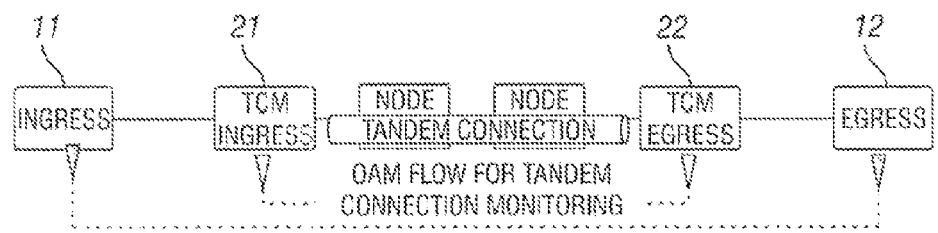
FIG. 2 (Prior Art) is an illustrative drawing of a communication connection 20 in which Tandem Connection Monitoring (TCM) of a segment of the connection has been implemented using an existing methodology.

Currently, two major alternatives, illustrated in FIGS. 1 and 2, are differentiated to implement segment monitoring.

FIG. 1 is an illustrative drawing of a communication connection in which Non-Intrusive Monitoring (NIM) of a segment of the connection has been implemented using an existing methodology. End-to-end traffic flows from an ingress node 11 to an egress node 12. A non-intrusive node (NIN) 13 sniffs the end-to-end traffic without modifying it. Upon detecting a problem on the segment between the ingress node and the NIN, the NIN invokes a subsequent action.

FIG. 2 is an illustrative drawing of a communication connection in which Tandem Connection Monitoring (TCM) of a segment of the connection has been implemented using an existing methodology. Again, end-to-end traffic flows from an ingress node 11 to an egress node 12. A TCM ingress node 21 inserts an additional OAM flow into the end-to-end traffic. A TCM egress node 22 de-multiplexes this additional flow and processes it. Based on this multiplexed signal, the TCM egress node measures the health of the segment between the TCM ingress node and the TCM egress node (and by extension, the end-to-end connection) and triggers actions as needed.

In the exemplary embodiments of the present invention described herein, new objects and methods are defined that enable general attributes to be specified for a particular node or interface along the route of a connection. The new objects are defined as a Hop Attributes object and a Hop Required Attributes object. The new objects are embedded into the Explicit Route Object (ERO) as described below in connection with the Hop Attributes sub-object and the Hop Required Attributes sub-object of FIG. 3.

Based on this signaling construct, configuration of segment monitoring is specified. All described options support both Non-Intrusive Monitoring and Tandem Connection Monitoring. To encapsulate the necessary OAM attributes, new objects such as a Segment OAM Configuration TLV, a TCM Entity (TCME) Configuration TLV, and an NIM Entity (NIME) Configuration TLV, are introduced. Two options for signaling the information are described.

In the first option, the one or two Hop Attributes objects embedded in the ERO are used to denote the monitoring endpoints. The Hop Attributes object carries the OAM object as defined below. In the second option, the Segment OAM configuration structure is embedded in the LSP Attributes object and is extended with a new object that identifies the interface along the path. Protocol extensions are described in connection with FIGS. 13-16.

The Segment OAM Configuration TLV gives a structure to encode all necessary information to configure a MN or TCM node. This structure can be included into the connection configuration in several ways:

Include these structures into the structure responsible for specifying the routes of the connection;

Include these structure into the structure that encodes the general LSP attributes; or Attach the structure to the configuration of segment protection.

The rationale behind the last option is that the segment OAM typically supports segment protection. The segment protection and the segment OAM can then be configured together.

Figure 3:
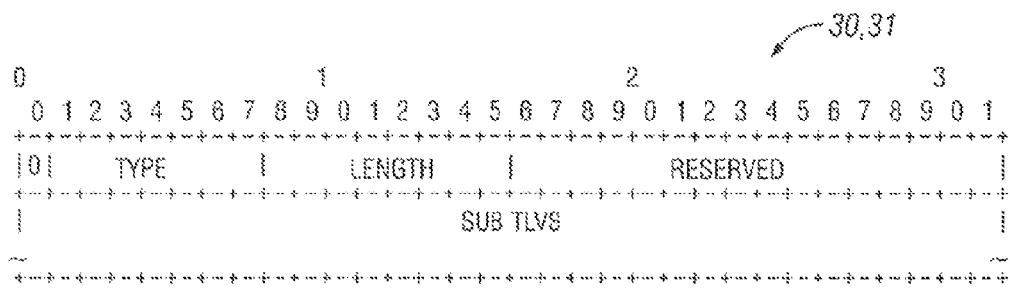
FIG. 3 illustrates an exemplary format of a Hop Attributes sub-object and a Hop Required Attributes sub-object according to an embodiment of the present invention.

FIG. 3 illustrates an exemplary format of a Hop Attributes sub-object 30 and/or a Hop Required Attributes sub-object 31 according to an embodiment of the present invention. The Hop Attributes sub-object is utilized to encode all parameters relevant to a node or to an interface in the path, including technology-independent OAM parameters and technology-specific attributes. This sub-object is added to the route objects of the ERO and SERO (Secondary Route Objects) as defined in RSVP-TE. The Hop Attributes sub-object follows a sub-object specifying the identifier of a node or an interface, and the Hop Attributes sub-object's content is relevant to the resource described by the preceding sub-object. A node can recognize some or all of the embedded TLVs. Any non-recognized TLVs are passed unmodified.

The Hop Attributes allows a node to skip the processing of some TLVs and thus not interpret all information carried in the attribute. In some specific cases, however, this is not an allowed option and thus an error must be issued when a contained TLV cannot be recognized. The Hop Required Attributes sub-object also includes the technology-independent OAM parameters and the technology-specific attributes A node reads the Hop Required Attributes sub-object when the node cannot interpret the contents of the Hop Attributes sub-object. The format of the Hop Required Attributes sub-object is the same as the Hop Attributes sub-object.

Figure 4:
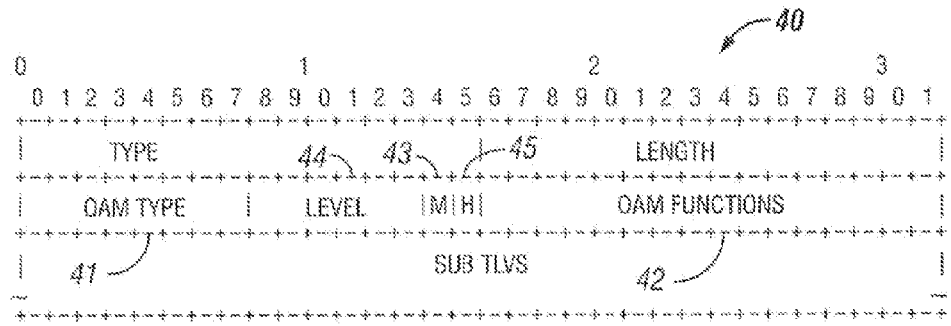
FIG. 4 illustrates an exemplary format of a Segment OAM Configuration TLV according to an embodiment of the present invention.

FIG. 4 illustrates an exemplary format of a new Segment OAM Configuration TLV 40 according to an embodiment of the present invention. Configuration of OAM monitored segments is made possible by applying the Hop Attributes sub-object. As discussed above, both Non-Intrusive and Tandem Connection Monitoring solutions are based on deploying monitoring entities along the route of a connection. All necessary attributes to configure these monitoring entities are stored in the new Segment OAM Configuration TLV. The Segment OAM Configuration TLV 40 is included in the Hop Attributes sub-object 30 that is inserted after an EROS entry specifying the node or interface to be configured.

The Segment OAM Configuration TLV 40 carries all the control flags that are necessary to provision the segment monitoring entity. Additionally, the structure may carry the technology-specific attributes encoded as sub-TLVs. The format and the use of the technology-specific attributes are technology-dependent and are not discussed further herein.

The Segment OAM configuration TLV applies the following fields of the end-to-end OAM configuration:

OAM Type 41: the OAM technology to be configured; and
OAM Functions 42: desired OAM functions.

Additionally, three new elements are added to the structure:

Monitoring Paradigm (bit "M") 43: specifies which monitoring paradigm is to be used: NIM monitoring (M=0) or TCM monitoring (M=1). In most cases, the controlled technology specifies which one of the two paradigms is available, but some technologies such as OTN digital path layer support both alternatives. If the monitoring paradigm is not supported an error is raised.

Monitoring key (Level) 44: provides a unique identifier for TCM monitoring to match the ingress and egress points of a TCM instance. The applicability and limitations of this key/level is technology-specific. In case of NIM monitoring, the value of the monitoring key is used to encode whether the NIM monitors the end-to-end flow or a TCM flow.

Monitoring position or direction (bit "H") 45: Contrary to the end-to-end monitoring configuration, where MEPs are the endpoints of the LSP, the context of a MEP does not necessarily specify whether it is a head-end or tail-end MEP. This flag unambiguously identifies whether the MEP is a head-end MEP (H=1) or a tail-end MEP (H=0). For NIM monitoring, the position expresses which direction is monitored: upstream (H=1) or downstream (H=0).

In the case of NIM monitoring (FIG. 1), a single monitoring entity (NIN node 13) is configured. Then a Hop Attribute sub-object is inserted after the ERO entry identifying the node or the interface where the monitoring entry must be deployed. The Hop Attribute sub-object carries a Segment OAM Configuration TLV. The referred ERO entry can be both strict and loose.

In the case of TCM monitoring (FIG. 2) two monitoring entities (TCM ingress node 21 and TCM egress node 22) are deployed, one at each endpoint of the TCM. For this purpose, after the ERO entries denoting the endpoints, Hop Attribute sub-objects are included for carrying the OAM attributes as well as control flags to support the segment OAM configuration. No extensions to support bidirectional connections are necessary since both endpoints can derive their roles in both directions: the ingress TCM endpoint 21 acts as the egress for the upstream direction while the egress TCM endpoint 22 performs the tasks of an ingress node as well.

To encode the necessary OAM attributes as well as the control flags, two encoding options are specified:

The first option utilizes a common signaling TLV: the Segment OAM Configuration TLV 40. A mode flag indicates whether a TCM entity or an MM entity is to be configured and the interpretation of other control flags depends on the value of the mode flag.

The second option utilizes the type code of the TLV to indicate which type of monitoring entity is to be configured. Therefore, two signaling TLVs are specified: a TCM Entity (TCME) Configuration TLV 50 and an NIM Entity (NIME) Configuration TLV 60.

Figure 5:
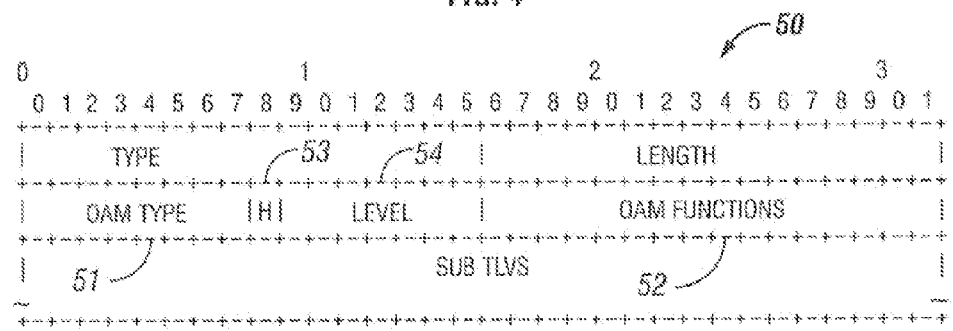
FIG. 5 illustrates an exemplary format of the TCME Configuration TLV according to an embodiment of the present invention.

FIG. 5 illustrates an exemplary format of the TCME Configuration TLV 50 according to an embodiment of the present invention. This structure carries all control flags that are necessary to provision the TCM entity. Additionally, the structure may carry the technology-specific attributes.

The TCME Configuration TLV 50 applies the OAM Type field 51 and the OAM Functions field 52 from the end-to-end OAM Configuration framework. It also defines two further fields:

Monitoring position (bit "H") 53 indicates whether the TCME MEP is a head-end MEP (H=1) or a tail-end MEP (H=0).

Monitoring key (Level) 54: provides a unique identifier for TCM monitoring to match the ingress and egress points of a TCM instance. The applicability and limitations of this key/level is technology-specific.

Figure 6:
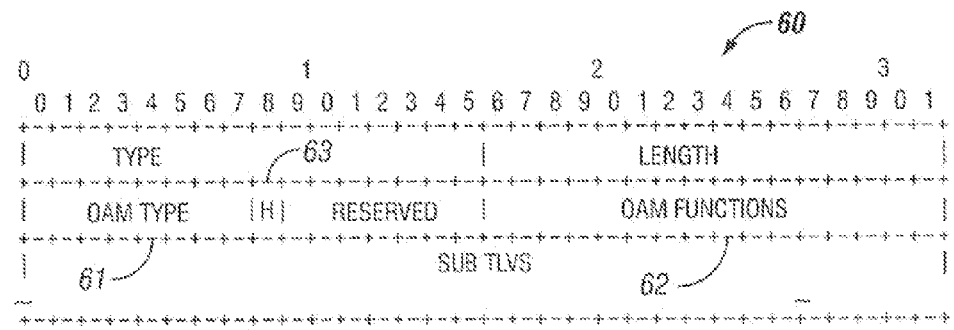
FIG. 6 illustrates an exemplary format of the NIME Configuration TLV according to an embodiment of the present invention.

FIG. 6 illustrates an exemplary format of the NIME Configuration TLV to 60 according to an embodiment of the present invention. This structure carries all control flags that are necessary to provision the NIM entity. Additionally, the structure may carry the technology-specific attributes.

The TCME Configuration TLV 60 applies the OAM Type field 61 and the OAM Functions field 62 from the end-to-end OAM Configuration t 5 framework. It defines one further field:

Monitoring direction (bit "H") 63: expresses which direction is monitored: upstream (H=1) or downstream (H=0).

Figure 7:
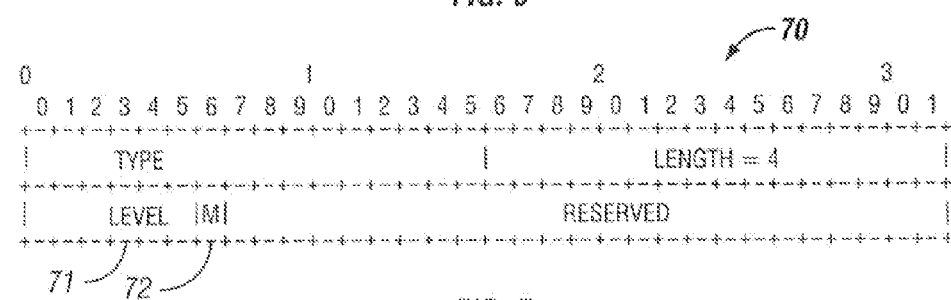
FIG. 7 illustrates an exemplary format of a Segment Monitor Indication sub-TLV according to an embodiment of the present invention

FIG. 7 illustrates an exemplary format of a Segment Monitor Indication sub-TLV 70 according to an embodiment of the present invention. For some technologies such as MPLS-TP, the tandem connections are considered as a server or sub-layer connection, and thus Forwarding Adjacency LSP (FA-LSP) signaling is used to provision them. For instance, in the case of MPLS-TP nesting, tunneling is applied due to the proposed forwarding constructions. For OTN or SDH LSP, both LSP stitching and end-to-end signaling mechanisms can be applied.

If FA-LSP signaling is used for TCM monitoring, provisioning the already defined OAM configuration framework can be adapted, since the endpoints of the FA-LSP denote the endpoints of the TCM as well. However, the framework does not carry the monitoring paradigm and monitoring key attributes. In the present invention, these two parameters are encoded as a sub-TLV of the end-to-end OAM configuration TLV. The format of the fields "LEVEL" 71 and "M" 72 are the same as in the Segment OAM configuration TLV 40.

The present invention includes procedures for matching the Segment OAM Configuration TLV 40 to the TCME Configuration TLV 50 and the MIME Configuration TLV 60. The TCME and NIME Configuration TLVs may be generated unambiguously based on the Segment OAM Configuration TLV as follows:

Check flag "M" 43 in the Segment OAM Configuration TLV 40: If M equals one (1), a TCME Configuration TLV is created; otherwise a NIME Configuration TLV is created.

All other attributes of the newly created TLV are set to the values carried in the Segment OAM Configuration TLV.

The SubTLVs of the Segment OAM Configuration TLV are copied to the newly created TLV.

A Segment OAM Configuration TLV 40 may be generated according to a TCME Configuration TLV 50 as follows:

Set flag "M" 43 in the Segment OAM Configuration TLV to a value of one (1).

All other attributes of the newly created TLV are set to the values carried in the TCME Configuration TLV.

The SubTLVs of the TCME Configuration TLV are copied to the newly created TLV.

A Segment OAM Configuration TLV 40 may be generated according to a NIME Configuration TLV 60 as follows:

Set flag "M" 43 in the Segment OAM Configuration TLV to a value of zero (0).

All other attributes of the newly created TLV are set to the values carried in the NIME. Configuration TLV.

The SubTLVs of the NIME Configuration TLV are copied to the newly created TLV.

These mapping rules indicate a one-to-one mapping between the two encoding options. Therefore, in the signaling options, both encoding options can be applied. For simplicity reasons, only the Segment OAM Configuration TLV case is described. The procedure for the other encoding option can be derived using the above rules.

The present invention also provides for OAM parameter inheritance. The Segment OAM Configuration TLV 40 carries a set of technology-specific parameters that are used to configure the segment monitoring instance. Some parameters of a particular segment may be the same as those used for the end-to-end connection, or a technology-specific default value is intended to be used. In such scenarios, encoding these parameters is not necessary. In one embodiment of the present invention, the following segment OAM parameter inheritance rules are utilized:

1. If a technology-specific parameter is encoded in the Segment OAM Configuration structure, the encoded value is applied.

2. If a technology-specific parameter is not encoded in the Segment OAM configuration structure, but is encoded in the end-to-end OAM configuration structure, the value relevant to the end-to-end connection is applied for the monitored segment as well.

3. If a technology-specific parameter is not encoded either in the Segment OAM configuration structure or in the end-to-end OAM configuration structure, the technology-specified default value is applied.

Other parameters, such as monitoring identifiers, cannot be inherited in this manner. If the Segment OAM Configuration structure does not encode them, the technology-specific default value (if one exists) is considered.

An end-to-end signaling-based option defines a method enabling the ingress node to configure segment OAM monitoring. It is assumed that the route of the connection to be provisioned is fully or partly pre-calculated and the endpoints of the monitored segments are explicitly determined. Then the Segment OAM Configuration TLVs are included in the Hop Attributes sub-object.

Figure 8:
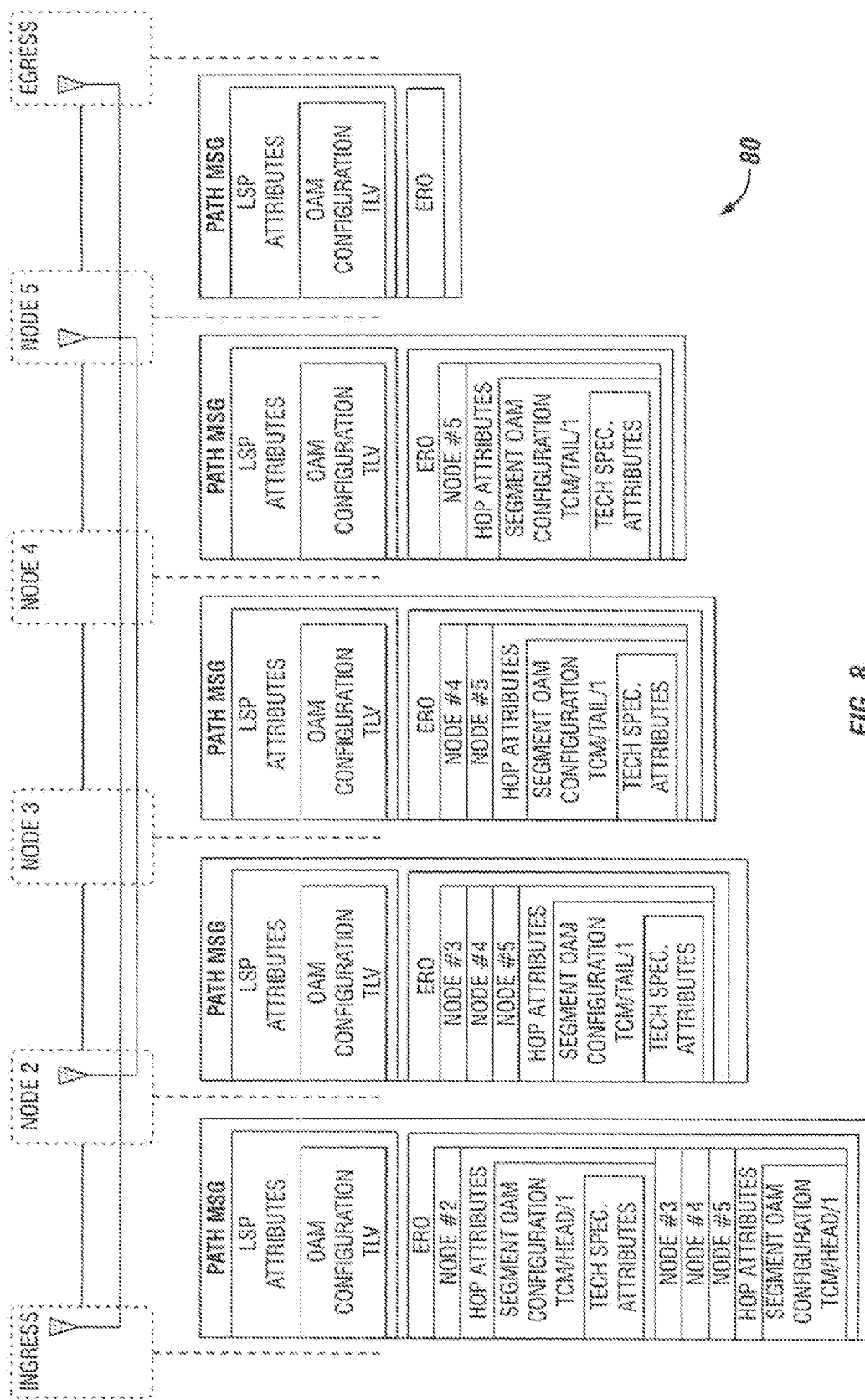
FIG. 8 illustrates a route description for an assigned segment OAM configuration for MM monitoring of a unidirectional connection.

FIG. 8 illustrates a route description 80 for an assigned segment OAM configuration for TCM monitoring.

Figure 9:
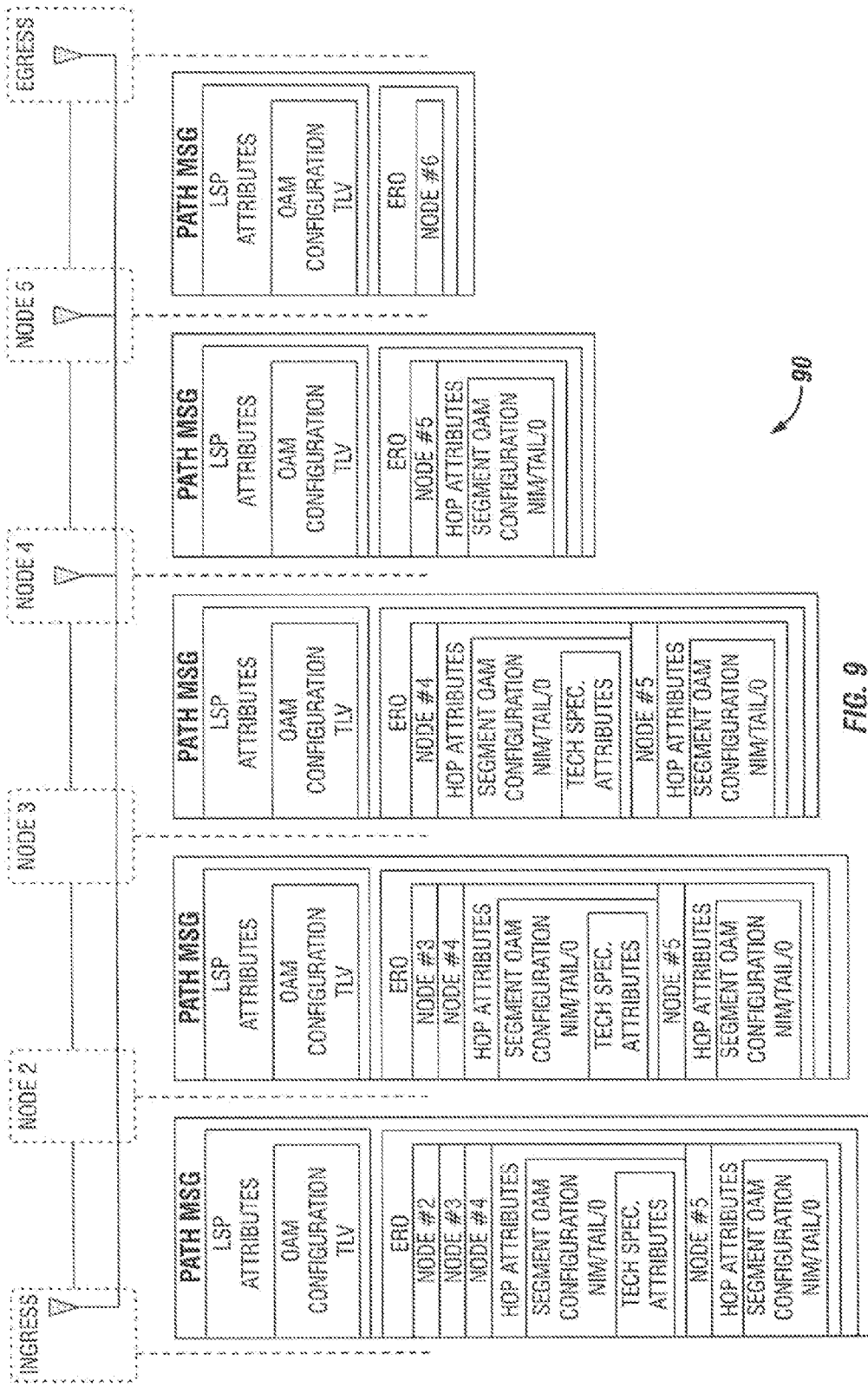
FIG. 9 illustrates a route description for an assigned segment OAM configuration for TCM monitoring.

FIG. 9 illustrates a route description 90 for an assigned segment OAM configuration for NIM monitoring of a unidirectional connection.

In the end-to-end signaling-based option, the present invention also provides for ingress node procedure updates. The Ingress node specifies zero or more segment monitor instances and zero or more non-intrusive monitoring nodes. Each segment monitor instance is specified as a pair of Segment OAM Configuration TLVs. The first TLV is inserted into a Hop Attributes sub-object 30 placed after the ERO entry defining the TCM ingress. The first TLV carries all necessary parameters to provision the TCM instance including the technology-specific attributes. The level parameter is set properly. The second TLV is inserted into a second Hop Attributes sub-object 30 placed after the ERO Entry defining the TCM egress. Typically the second TLV does not carry any technology-specific sub-TLVs; it acts only as a guard to indicate the TCM egress.

Each non-intrusive monitor instance is specified with a single Segment OAM Configuration TLV 40 that is included in a Hop Attributes sub-object 30 placed after the ERO entry referring to the monitoring element.

In the end-to-end signaling-based option, the present invention also defines procedures for the TCM ingress node. During parsing of the ERO of a received PATH message, a node may detect that the node is a TCM ingress node when a Hop Attributes sub-object 30 is placed after the ERO entry referring to the node (1st entry) and carries a Segment OAM Configuration TLV 40 with "M" and "H" flags set to 1. Then, the node looks for such a Segment OAM Configuration TLV 40 embedded in a Hop Attributes sub-object 30 in the route describing object, which carries flag "M" set to 1, and flag "H" set to 0 with the same Level value. To achieve this, the node parses the entries of the route describing object one-by-one. After finding an ERO entry for which a Hop Attributes sub-object carrying the Segment OAM Configuration TLV is defined, the following conditions are checked if the flag "M" is set:

If the Level value is the same as the value set for the TCM ingress and flag "H" is set to 0, the TCM egress is found and the procedure continues.

If the Level value is the same as the value set for the TCM ingress and the "H" is set to 1, an error is triggered since two overlapping TCM instances must not use the same level value.

If the Level value differs from the value set for the TCM ingress, the ERO parsing procedure continues regardless the value of flag "H".

If the proper TCM egress is found, the TCM ingress node may extend the Segment OAM configuration TLV belonging to the TCM egress node with a further locally generated attribute and based on the Segment OAM configuration TLV belonging to the TCM ingress node, if necessary. Then the signaling procedure continues as specified by standards.

The maintenance entities are configured upon receiving the RESV message.

Figure 10:
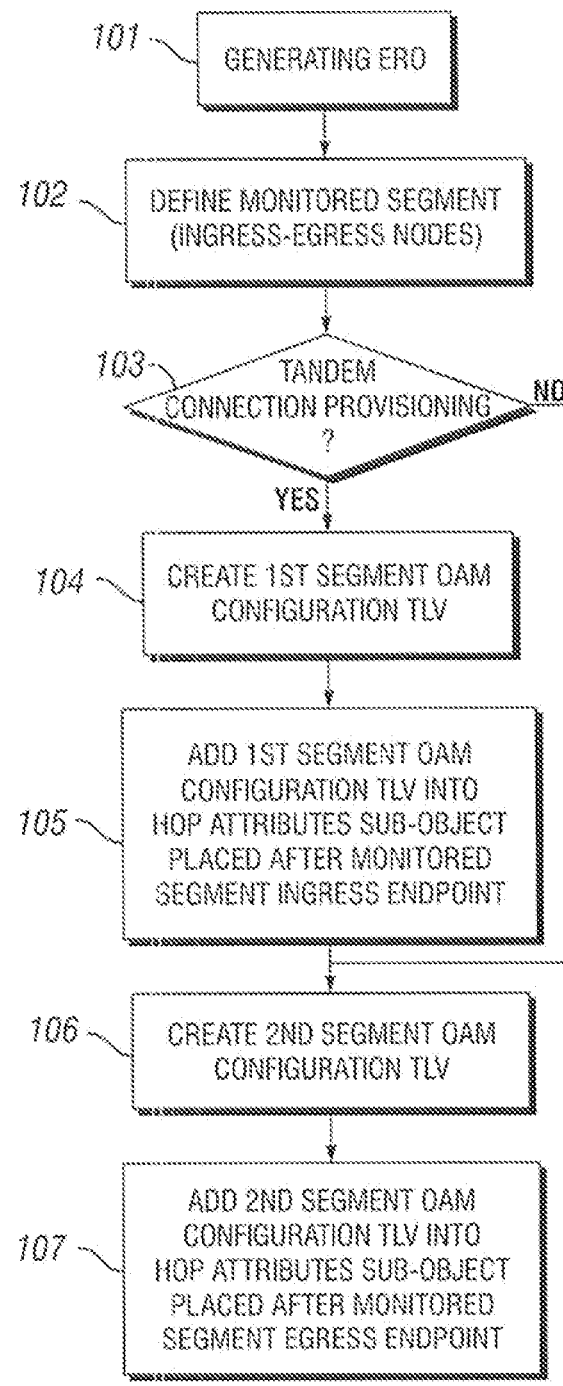
FIG. 10 is a flow chart illustrating the steps of an exemplary configuration procedure performed by a source node/connection ingress node.

FIG. 10 is a flow chart illustrating the steps of an exemplary configuration process performed by a source node/connection ingress node. The process will be described with reference to FIGS. 8 and 10. At step 101, the ingress node generates an ERO. At step 102, the monitored segment is defined by identifying the ingress and egress nodes. At step 103, it is determined whether Tandem Connection provisioning is being utilized. If not, the process skips to step 106. However, if Tandem Connection provisioning is being utilized, the process moves to step 104 where the ingress node creates the first Segment OAM Configuration TLV 40. At step 105, the first Segment OAM Configuration TLV is added into the Hop Attributes sub-object 30 placed after the monitored segment ingress endpoint. At step 106, the ingress node creates a second Segment OAM Configuration TLV, and at step 107 the second Segment OAM Configuration TLV is added into the Hop Attributes sub-object 30 placed after the monitored segment egress endpoint.

In the end-to-end signaling-based option, the present invention also defines procedures for the TCM egress node. During parsing of the ERO of a received PATH message, a node may detect that the node is a TCM egress node when a Hop Attributes sub-object is placed after the ERO entry referring to the node (1st entry) and carries a Segment OAM Configuration TLV with "M" and "H" flags set to 1 and 0, respectively. Then, the node parses the Segment OAM Configuration TLV and continues the signaling processes based on the standards. The TCM endpoint is provisioned upon receiving the corresponding RESV message.

In the end-to-end signaling-based option, the present invention also handles the NIM monitoring node. During parsing of the ERO of a received PATH message, a node may realize that the NIM monitoring function should be configured when a Hop Attributes sub-object is placed after the ERO entry referring to the node (1st entry) and carries a Segment OAM Configuration TLV with "M" set to 0. Then, the node parses and stores the content of the Segment OAM Configuration TLV and continues the already specified operation. NIM monitoring is provisioned upon the receipt of the corresponding RESV message.

Figure 11:
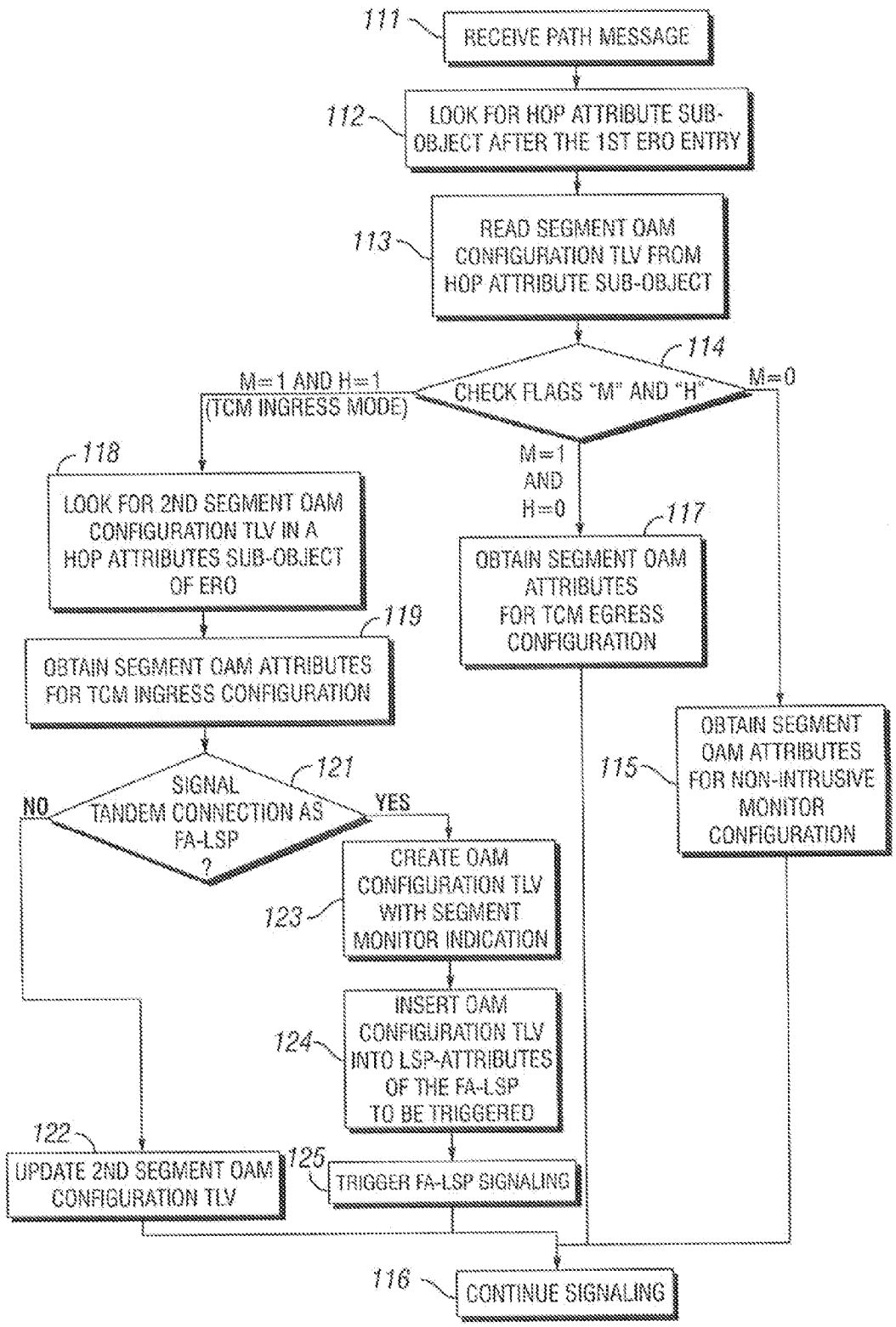
FIG. 11 is a flow chart illustrating the steps of an exemplary configuration procedure performed by any intermediate node implementing a TCM endpoint (both TCM ingress and TCM egress nodes)

FIG. 11 is a flow chart illustrating the steps of an exemplary configuration process performed by any intermediate node implementing a TCM endpoint (both TCM ingress and TCM egress nodes). At step 111, the TCM endpoint node receives a path message. At step 112, the node looks for a Hop Attributes sub-object after the first ERO entry. At step 113, the node reads the Segment OAM Configuration TLV from the Hop Attributes sub-object. At step 114, the node checks the flags "M" and "H". If the "M" flag equals zero (0), the process moves to step 115 where the node obtains Segment OAM attributes for the NIM configuration. The process then moves to step 116 and continues signaling.

However, if at step 114 it is determined that the "M" flag equals one (1) and the "H" flag equals zero (0), the process moves to step 117 where the TCM endpoint node obtains Segment OAM attributes for the TCM egress configuration. The process then moves to step 116 and continues signaling.

Finally, if at step 114 it is determined that the "M" flag equals one (1) and the "H" flag equals one (1), the process moves to step 118 where the TCM endpoint node (now designated a TCM ingress node) looks for a second Segment OAM Configuration TLV in a Hop Attributes sub-object of the ERO. The process then moves to step 119 where the node obtains Segment OAM attributes for the TCM ingress configuration The process then moves to step 121 where it is determined whether to signal the tandem connection as FA-LSP. If not, the process moves to step 122 where the node updates the second Segment OAM Configuration TLV. The process then moves to step 116 and continues signaling.

If at step 121 it is determined that the TCM ingress node is to signal the tandem connection as FA-LSP, the process moves to step 123 where the node creates an OAM Configuration TLV with a segment monitor indication. At step 124, the node inserts the OAM Configuration TLV into the LSP-Attributes of the FA-LSP to be triggered. At step 125, the node triggers FA-LSP signaling. The process then moves to step 116 and continues signaling.

The present invention also provides procedures for a dedicated LSP signaling-based option. TCM monitoring can be configured with the help of dedicated LSP signaling sessions. In order to properly configure the TCM endpoints, both the end-to-end and the dedicated LSP signaling procedures must be updated. The ingress node procedures are the same as specified for the Segment OAM Configuration TLV.

In the dedicated LSP signaling-based option, the TCM ingress node is determined similarly to the procedure in the end-to-end signaling option. During parsing of the ERO of a received PATH message, a node may detect that it is a TCM ingress node and may look for the TCM egress as described above for the end-to-end signaling option. Then the TCM is provisioned using an FA-LSP signaling construct. The TCM OAM configuration parameters are encoded as the end-to-end OAM configuration. The proper values are derived from the Segment OAM Configuration sub-object. The end-to-end OAM Configuration TLV of the FA-LSP session is extended with the Segment Monitor Indication TLV. After provisioning the TCM, the end-to-end signaling session is updated. Since the FA-LSP provisioned the TCM configuration, there is no need for further OAM configuration-related action.

In the dedicated LSP signaling-based option, the TCM egress node is already provisioned upon receiving the end-to-end signaling session since the tandem connection is configured with a dedicated LSP signaling session. The binding between the end-to-end signaling session and the TCM dedicated LSP signaling session is ensured by the signaling context.

Figure 12:
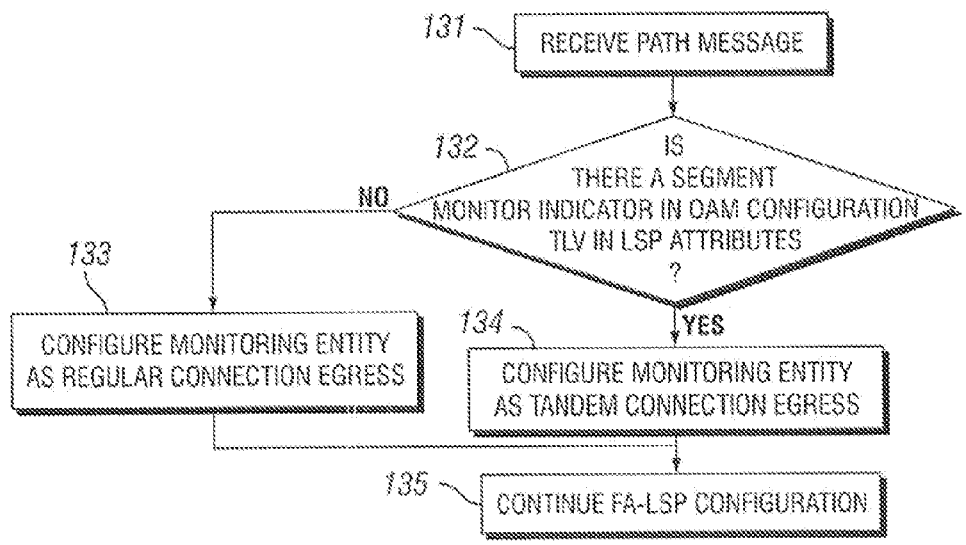
FIG. 12 is a flow chart illustrating the steps of an exemplary procedure for supporting FA-LSP triggered TCM monitoring configuration.

FIG. 12 is a flow chart illustrating the steps of an exemplary process for supporting FA-LSP triggered TCM monitoring configuration. At step 131, a path message is received. At step 132, the node looks for a segment monitor indicator in the OAM Configuration TLV in the LSP attributes. If there is no segment monitor indicator, the process moves to step 133 where the monitoring entity is configured as a regular connection egress. The process then moves to step 135 where FA-LSP configuration is continued. If there is a segment monitor indicator at step 132, the process moves to step 134 where the monitoring entity is configured as a TCM egress.

The present invention also provides procedures for an LSP Attribute embedded option. This option defines a method to encode OAM segment monitoring instances. For this purpose, the Segment OAM configuration TLV is included in the LSP Attributes object. In this case, an LSP attribute object may contain among others, up to 1 OAM configuration TLV and zero or more Segment OAM configuration TLVs: one for each monitored segment.

In the LSP Attribute embedded option, there are procedures for identifying the monitoring endpoint. Since the context of the TLV does not specify the endpoints, this information may be included as a new sub-TLV. This structure encodes the information necessary to place a monitoring endpoint on a particular (internal) interface/node along the path. Note, that the monitoring endpoints placed at the endpoints of a connection do not need this extension since this information is typically already encoded in the connection signaling. The following parameters are encoded:

An identifier of the node or interface where the monitoring endpoint is to be configured; and The monitoring position "H" flag. The "H" flag encodes that the head-end (upstream) monitoring endpoint is to be configured (H=1) or the tail-end (downstream) endpoint (H=0) is to be configured.

Figure 13:
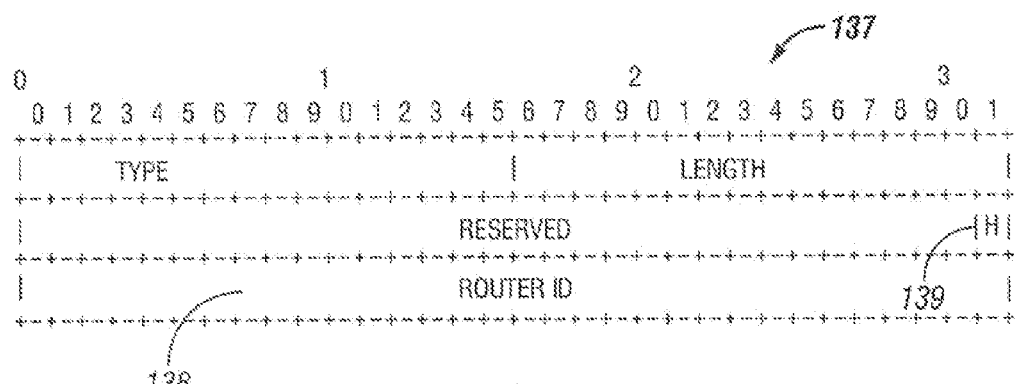
FIG. 13 illustrates an exemplary format of a MEP Router D Sub-TLV according to an embodiment of the present invention.

FIG. 13 illustrates an exemplary format of a MEP Router ID Sub-TLV 137 according to an embodiment of the present invention. Using RSVP-TE, the MEP Router ID 138 encodes the identifier of the node, while bit "H" 139 encodes whether an upstream or downstream MEP/MIP is configured on the router.

Figure 14:
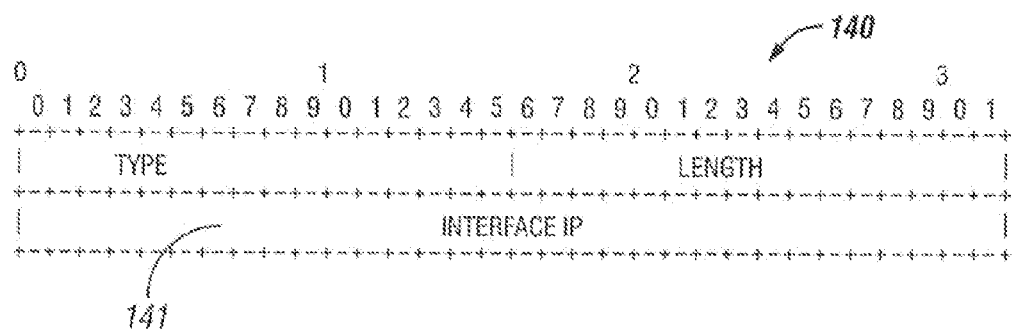
FIG. 14 illustrates an exemplary format of a MEP Interface IP Sub-TLV according to an embodiment of the present invention.

FIG. 14 illustrates an exemplary format of a MEP Interface IP Sub-TLV 140 according to an embodiment of the present invention. Using RSVP-TE, the MEP Interface IP 141 identifies the numbered interface. Since the interface itself determines the direction as well, there is no need for an additional bit to indicate the monitoring position.

Figure 15:
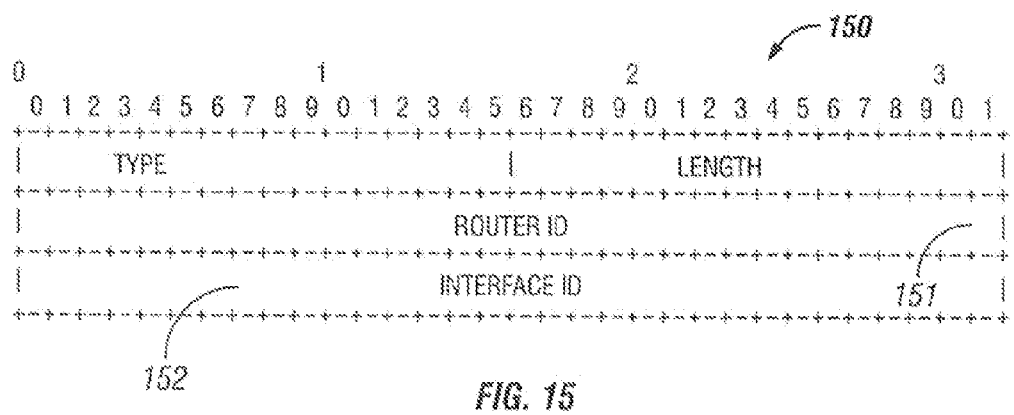
FIG. 15 illustrates an exemplary format of a MEP Numbered Interface IP Sub-TLV according to an embodiment of the present invention.

FIG. 15 illustrates an exemplary format of a MEP Numbered Interface IP Sub-TLV 150 according to an embodiment of the present invention. Using RSVP-TE, the Router ID 151 together with the Interface ID 152 identifies the unnumbered interface.

In the LSP Attribute embedded option, certain node procedures are defined. For the ingress node, the node constructs the Segment OAM monitoring TLVs based on configuration and/or local policies and includes them in the LSP Attributes object.

For any non-ingress nodes, upon receipt of a Path message, each node determines whether either its Router ID, or the data plane interfaces to be allocated for that LSP, is defined in any of the Segment OAM configuration TLVs. If a matching entry is found, the node matches the "H" bit with the "H" bit of the container Segment OAM configuration TLV. Carrying different values in the two "H" bits indicates a configuration error, and the upstream neighbor is notified of this error. If the two "H" bits match, the node prepares for configuring the MEP if necessary. If an upstream MEP is configured ("H" bit is set to 1), then the node updates the "H" bit of the corresponding Segment OAM configuration TLV to a value of zero (0).

If the node acts as a branching node, the LSP Attributes object generated for the recovery LSP signaling is extended with an OAM configuration TLV, which is based on the matched Segment OAM configuration TLV. If the node acts as a merging node, the configuration of the protected segment and the recovery LSP is done independently.

Figure 16:
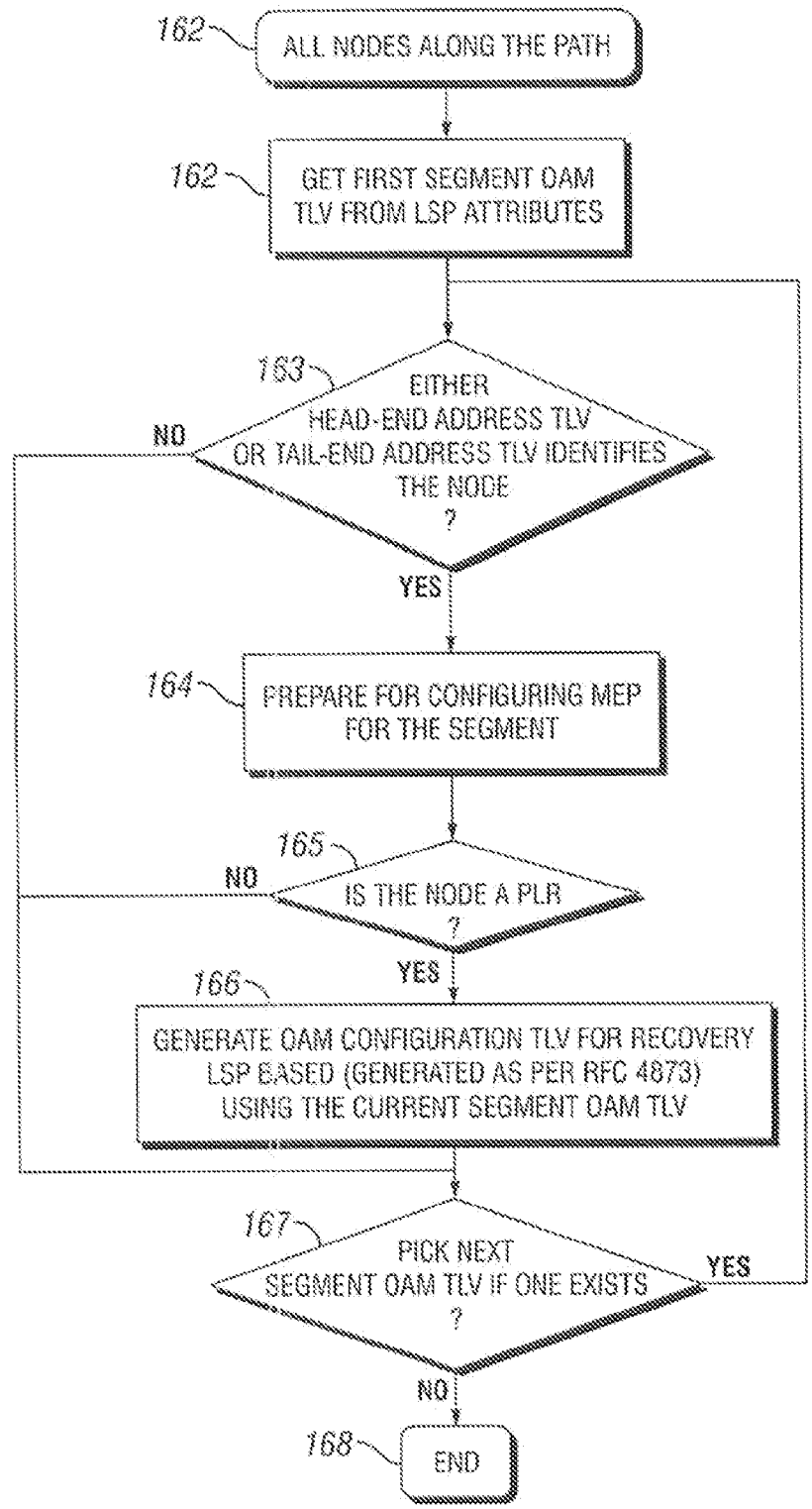
FIG. 16 is a flowchart illustrating the steps of an exemplary method of node operations in the LSP Attribute embedded option.

FIG. 16 is a flowchart illustrating the steps of an exemplary process of node operations in the LSP Attribute embedded option. At step 161, it is noted that the procedure is applicable to all nodes along the path. At step 162, a node in the path gets a first Segment OAM TLV from the LSP Attributes. At step 163, the node determines whether either a head-end address TLV or a tail-end address TLV identifies the node. If not, the process moves to step 167 where the node picks the next Segment OAM TLV if one exists.

However, if at step 163, either a head-end address TLV or a tail-end address TLV identifies the node, the process moves to step 164 where the node prepares for configuring the MEP for the segment. At step 165, it is determined whether the node is a Point of Local Repair (PLR) (see RFC 4090). If not, the process moves to step 167 where the node picks the next Segment OAM TLV if one exists. However, if the node is a PLR, the process moves to step 166 where the node generates an OAM Configuration TLV for recovery LSP based (generated as per RFC 4873) using the current Segment OAM TLV. The process then moves to step 167 where the node picks the next Segment OAM TLV if one exists. If one exists, the process returns to step 163. Otherwise, the process ends at step 168.

Segment protection provides protection and restoration over a portion of an end-to-end LSP. Such segment protection and restoration is useful to protect against a span failure, a node failure, or failure over a particular portion of a network used by an LSP.

The invention also provides for OAM configuration in the case of explicitly controlled segment protection. Per RFC 4873, the ingress node may have explicit control over the segment protection/recovery. This means that the ingress node specifies the protection segments encoding the endpoints (PLR and MN) as well as protection related attributes. The SERO is specified to carry these attributes, while the end-to-end path (including the protected segments) is encoded with the help of the ERO.

In most transport technologies cases, the OAM attributes to be applied for the protected segment differ from the end-to-end OAM parameters. Moreover, the protection and the protecting segments use different parameters values, for example, different MEP identifiers. This raises the need for asymmetric OAM configuration where different sets of parameters are defined for the protected and the protecting segments.

However, it is not desirable, or the ingress node may not be able to specify all OAM attributes (especially the identifiers) for the protected and the protecting segments. If the declared parameters such as timers, thresholds, message rates, and the like are the same for the protected and the protecting segments, a single set of OAM parameters are enough. Here, the symmetric OAM configuration applies.

Applying the Hop Attributes signaling object described above, the ingress node can define some or all of the OAM configuration parameters: timers, thresholds, and identifiers.

For the ingress node procedures, during construction of the segment protection instances, the ingress node includes a first segment OAM attributes structure that is encoded for the protected segment and is inserted into the SERO. When different OAM attributes apply to the protected segments, a second Segment OAM attributes structure is constructed and is inserted into either the SERO or ERO.

For branching node procedures, as per RFC 4873, any internal node can detect whether it acts as a branching node for a protection segment instance. If so, the node triggers a new end-to-end signaling session for the protecting segment.

The maintenance endpoint for the protecting segment is configured according to the Segment OAM configuration structure carried in the SERO. The OAM parameters needed by the remote MEP are encoded as an end-to-end OAM configuration being part of the end-to-end signaling session establishing the protecting segment. If all of the parameters required by the remote endpoint are not obtained from the Segment OAM configuration structure, the Branching node determines these parameters locally and includes them in the end-to-end OAM configuration session. For example, the maintenance endpoint identifiers may be generated by the branching node and may be included as such additional parameters.

In case of symmetric OAM configuration, the OAM attributes specified in the SERO are relevant to the protected segments as well. The MEP for the protected segment is configured using these parameters. If all of the parameters required by the remote endpoint are not obtained from the common Segment OAM configuration TLV structure, the Branching node determines these parameters locally. The updated Segment OAM configuration TLV is included in the ERO placed after the entry referring to the Merging Node. The protected segment can be signaled as an FA-LSP, and then the same procedures apply as for the protecting segments.

For merge node procedures, since the protecting segment s configured with the help of a dedicated end-to-end session, no specific updates are needed to configure the protecting segment monitoring endpoint. To configure the protected segment monitoring endpoint, the MN determines whether a Segment OAM configuration TLV is included immediately after the first ERO entry. If so, the content of the Segment OAM configuration TLV is used to configure the monitoring endpoint. Otherwise, the merging node determines the signaling session describing the protecting segment (using the ASSOCIATION object) and uses the OAM attributes of that session. If no such OAM attribute structure is found, no additional monitoring endpoint for the protected segments is to be provisioned.

The invention also provides for OAM configuration in the case of implicitly controlled segment protection. Dynamic control makes distributed branch/merging node selection possible. The ingress node does not specify either the branch or the merging nodes, but each node along the path makes a local decision as to whether it will act as a branching node. Although most OAM parameters must be selected by the branching node, some parameters may be defined (for example, thresholds) for every protected segment by the ingress node. This embodiment updates the Protection object defined in RFC 4873 to specify such parameters with multiple protection segment scope by adding a general sub-TLV field.

Figure 17:
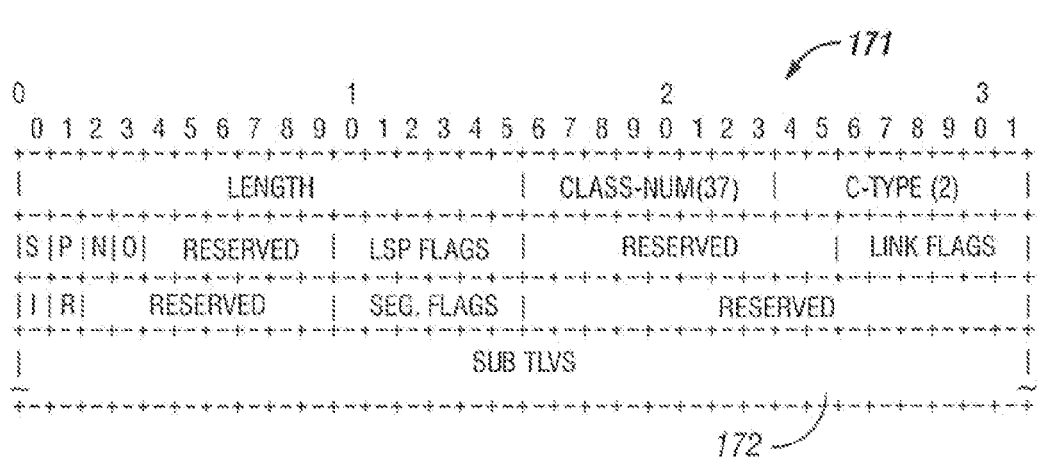
FIG. 17 illustrates an exemplary format of a segment protection object with a general sub-TLV field according to an embodiment of the present invention.

FIG. 17 illustrates an exemplary format of a segment protection object 171 with a general sub-TLV field 172 according to an embodiment of the present invention. The Segment. OAM Configuration TLV is embedded into the Protection object and this object carries the OAM related parameters. Within the embedded Segment OAM Configuration TLV, control flags LEVEL and "H" must be set to zero (0) and must be ignored during parsing. Control flag "M" indicates whether TCM or NIM monitoring is used.

Figure 18:
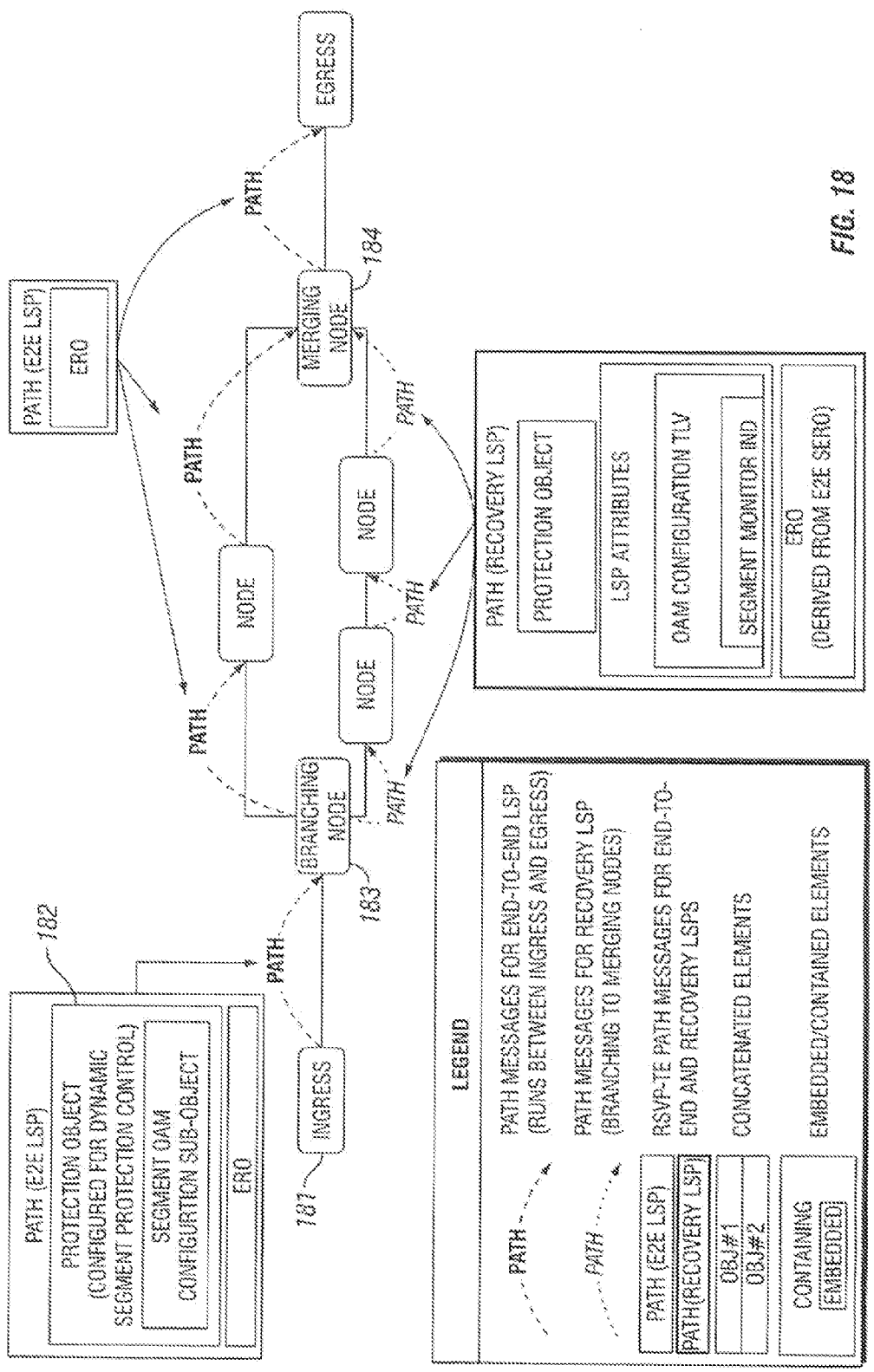
FIG. 18 illustrates a method of configuring segment recovery and OAM monitoring with dynamic control.

FIG. 18 illustrates a process of configuring segment recovery and OAM monitoring with dynamic control. Note the figure shows only the objects relevant to the OAM configuration and segment recovery.

For ingress node procedure updates, an ingress node 181 generates the extended Protection object 182 and optionally includes the Segment OAM Configuration TLV as a sub-TLV. All control flags are set as previously discussed.

For branching node procedure updates, each node that decides to be a branching node 183 parses the sub-TLV field of the extended Protection object 182. If the node finds the Segment OAM Configuration TLV, the node issues the OAM signaling of the protecting LSP. The OAM attributes to be signaled in that session are derived from the content of the Segment OAM Configuration TLV. The Segment Monitor Indication is included as well to indicate that MM or TCM monitoring is to be provisioned for the protecting LSP.

Some transport technologies (for example, MPLS-TP) implement Tandem. Connections as tunnels. The end-to-end connection is nested into the tunnel, and the tunnel is provisioned as an FA-LSP. The signaling session of the FA-LSP carries the OAM parameters of the protected segment and its content derived from the Segment OAM Configuration TLV and possibly extended with further attributes by the branching node.

For merging node procedures, since the branching node 183 explicitly generates the Segment OAM configuration structures, the merging node 184 applies the procedure described above for explicitly controlled segment protection.

Figure 19:
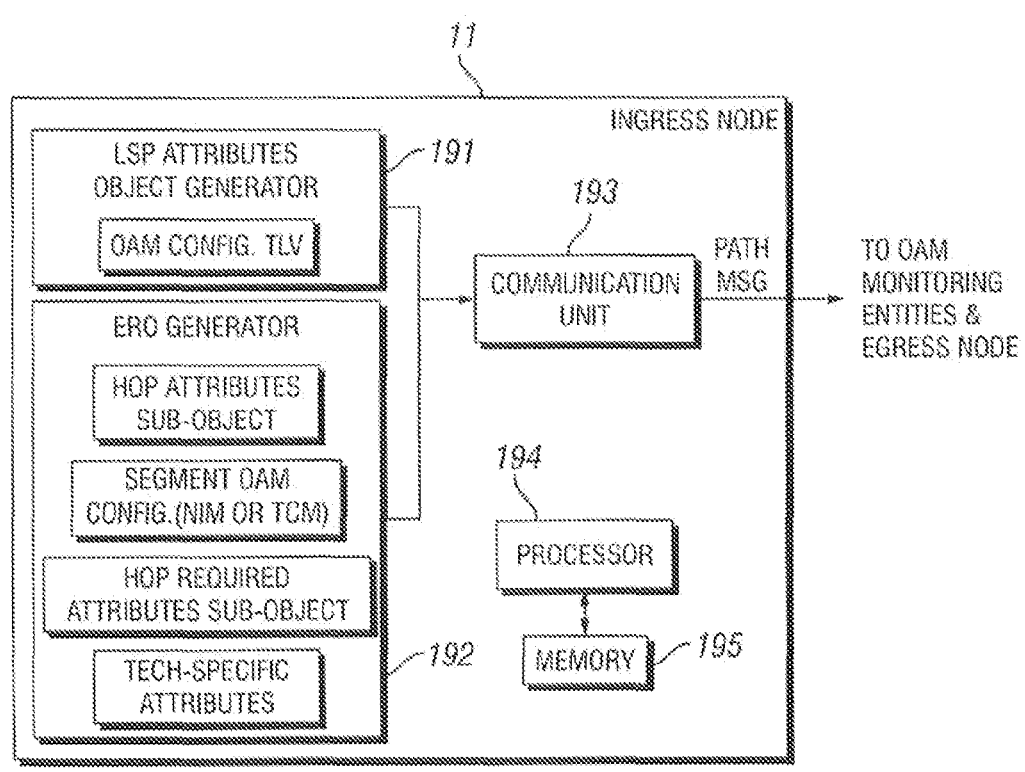
FIG. 19 is a simplified block diagram of an ingress node for implementing an embodiment of the present invention.

FIG. 19 is a simplified block diagram of an ingress node 11 for implementing an embodiment of the present invention. Two alternative structures for generating configuration information are illustrated. First, an LSP Attributes object generator 191 may embed the OAM Configuration TLV into the LSP attributes object. Second, an ERO generator 192 adds the information to the ERO. In either case, the information is provided to a communication unit 193, which includes the information in a path message sent to OAM monitoring entities in the path and to the egress node 12. The operation of the ingress node may be controlled by a processor 194 executing computer program instructions stored on a memory 195.

Thus, the present invention as described in the various embodiments above, provides a general signaling construction that enables the ingress node to specify preferences, attributes, and flags to be applied at a particular interface of an internal node. Utilizing this construction, the invention provides several options for signaling OAM configuration information to setup monitoring support for segment protection. All signaling options are technology-independent.

The described OAM configuration framework is combined with the GMPLS segment protection signaling scheme and results in a compact and flexible solution to configure the OAM attributes (for example, timers, message rates, and the like) used at segment protection endpoints.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method performed by an ingress node of a communication connection for configuring nodes along the connection to monitor quality of both the entire connection from the ingress node to an egress node and at least one segment of the connection shorter than the entire connection, the method comprising:

transmitting a path message to the egress node, via a plurality of intermediate nodes, that configures Operation and Maintenance (OAM) monitoring of the entire connection by the egress node and that configures OAM monitoring of at least one segment of the connection shorter than the entire connection by at least one of the intermediate nodes;

wherein the path message comprises:
  a Label Switching Protocol (LSP) attributes object that comprises:
    technology-specific attributes defining descriptors for configuring the egress node in accordance with a communication protocol utilized for the connection; and
    technology-independent OAM parameters that, irrespective of the communication protocol utilized for the connection, define an OAM type to be used by the egress node, and define desired monitoring actions to be performed by the egress node; and
  an Explicit Route Object (ERO) that comprises a respective Hop Attributes sub-object for configuring each of the at least one intermediate nodes, each HOP Attributes sub-object comprising:
    technology-specific attributes that define descriptors for configuring the at least one intermediate node in accordance with the communication protocol utilized for the connection; and
    technology-independent OAM parameters that, irrespective of the communication protocol utilized for the connection, define whether the at least one intermediate node is to perform Non-Intrusive Monitoring (NIM) or Tandem Connection Monitoring (TCM), define OAM monitoring actions to be performed by the at least one intermediate node, and at least partially define the segment to be monitored.

2. The method of claim 1, wherein the communication protocol is a Resource Reservation Protocol-Traffic Engineering (RSVP-TE) protocol, and wherein a Generalized Multi-Protocol Label Switching (GMPLS) protocol is utilized to send the path message.

3. The method of claim 1:
wherein the ERO further comprises a HOP Required Attributes sub-object, and each of the at least one intermediate nodes cancels the entire connection when it cannot interpret the contents of the Hop Required Attributes sub-object.

4. The method of claim 1:
wherein the communication protocol is a Resource Reservation Protocol-Traffic Engineering (RSVP-TE) protocol; and
wherein the LSP Attributes object includes its technology-independent OAM parameters, identities of the intermediate nodes to be configured, and its technology-specific attributes within an OAM Configuration Type-Length-Value (TLV) field.

5. An ingress node of a communication connection for configuring nodes along the connection to monitor quality of both the entire connection from the ingress node to an egress node and at least one segment of the connection shorter than the entire connection, the ingress node comprising:
memory that stores instructions for operation of the ingress node; and
processing circuitry operatively connected to the memory and configured to:
  transmit a path message to the egress node, via a plurality of intermediate nodes, that configures Operation and Maintenance (OAM) monitoring of the entire connection by the egress node and that configures OAM monitoring of at least one segment of the connection shorter than the entire connection by at least one of the intermediate nodes;
wherein the path message comprises:
  a Label Switching Protocol (LSP) attributes object that comprises:
    technology-specific attributes defining descriptors for configuring the egress node in accordance with a communication protocol utilized for the connection; and
    technology-independent OAM parameters that, irrespective of the communication protocol utilized for the connection, define an OAM type to be used by the egress node, and define desired monitoring actions to be performed by the egress node; and
  an Explicit Route Object (ERO) that comprises a respective Hop Attributes sub-object for configuring each of the at least one intermediate nodes, each Hop Attributes sub-object comprising:
    technology-specific attributes that define descriptors for configuring the at least one intermediate node in accordance with the communication protocol utilized for the connection; and
    technology-independent OAM parameters that, irrespective of the communication protocol utilized for the connection, define whether the at least one intermediate node is to perform Non-Intrusive Monitoring (NIM) or Tandem Connection Monitoring (TCM), define OAM monitoring actions to be performed by the at least one intermediate node, and at least partially define the segment to be monitored.

6. The ingress node of claim 5, wherein the communication protocol is a Resource Reservation Protocol-Traffic Engineering (RSVP-TE) protocol.

7. The ingress node of claim 5:
wherein the ERO further comprises a HOP Required Attributes sub-object, and each of the at least one intermediate nodes cancels the entire connection when it cannot interpret the contents of the Hop Required Attributes sub-object.

8. The ingress node of claim 5:
wherein the communication protocol is a Resource Reservation Protocol-Traffic Engineering (RSVP-TE) protocol; and
wherein the processing circuitry is configured to utilize Generalized Multi-Protocol Label Switching (GMPLS) signaling to send the path message.

9. The ingress node of claim 5:
wherein the communication protocol is a Resource Reservation Protocol-Traffic Engineering (RSVP-TE) protocol; and
wherein the processing circuitry is configured to utilize Generalized Multi-Protocol Label Switching (GMPLS) signaling to send the LSP Attributes object; and
wherein the LSP attributes object includes its technology-independent OAM parameters, identities of the intermediate nodes to be configured, and its technology-specific attributes within an OAM Configuration Type-Length-Value (TLV) field.

* * * * *

UNITED STATES PATENT AND TRADEMARK OFFICE
CERTIFICATE OF CORRECTION

PATENT NO. : 9,043,449 B2  
APPLICATION NO. : 13/502009  
DATED : May 26, 2015  
INVENTOR(S) : Kern et al.

Page 1 of 2

It is certified that error appears in the above-identified patent and that said Letters Patent is hereby corrected as shown below:

Drawings

In Fig. 16, Sheet 9 of 12, delete "  " and insert --  --, therefor.

Specification

In Column 3, Line 42, delete "MM" and insert -- NIM --, therefor.

In Column 3, Line 56, delete "Router D" and insert -- Router ID --, therefor.

In Column 3, Lines 57-58, delete "invention:" and insert -- invention; --, therefor.

In Column 4, Line 11, delete "ma;or" and insert -- major --, therefor.

In Column 4, Line 59, delete "MN" and insert -- NIN --, therefor.

In Column 5, Lines 24-25, delete "technology-independent." and insert -- technology-independent --, therefor.

In Column 5, Line 25, delete "attributes" and insert -- attributes. --, therefor.

In Column 5, Line 40, delete "EROS" and insert -- ERO --, therefor.

Signed and Sealed this  
Twenty-fourth Day of November, 2015

Michelle K. Lee  
*Director of the United States Patent and Trademark Office*

Specification

In Column 6, Line 25, delete "directions:" and insert -- directions; --, therefor.

In Column 6, Line 32, delete "MM" and insert -- NIM --, therefor.

In Column 6, Line 57, delete "to 60" and insert -- 60 --, therefor.

In Column 6, Line 63, delete "t 5 framework." and insert -- framework. --, therefor.

In Column 7, Line 23, delete "MIME" and insert -- NIME --, therefor.

In Column 7, Line 49, delete "NIME." and insert -- NIME --, therefor.

In Column 13, Line 20, delete "segment s" and insert -- segment is --, therefor.

In Column 13, Line 48, delete "Segment." and insert -- Segment --, therefor.

In Column 14, Line 3, delete "MM" and insert -- NIM --, therefor.

In Column 14, Line 7, delete "Tandem." and insert -- Tandem --, therefor.